INVENTORS
ROBERT P. COX
LUTHER L. YAEGER and
BY  RALPH W. BUETOW

Oscar Spencer
ATTORNEY

United States Patent Office 2,941,912
Patented June 21, 1960

2,941,912

SURFACE TREATMENT OF HALOGENATED FLUOROETHYLENES AND LAMINATES THEREOF

Robert P. Cox, Luther L. Yaeger, and Ralph W. Buetow, Madison, Wis., assignors to Pittsburgh Plate Glass Company Original application Mar. 24, 1953, Ser. No. 344,398, now Patent No. 2,788,306, dated Apr. 9, 1957. Divided and this application Sept. 25, 1956, Ser. No. 616,902

22 Claims. (Cl. 154—43)

This invention relates to an improved method for treating the surfaces of certain non-polar substances to render them suitable for adhesion to other substances and to various practical applications thereof, such as applying a superior thin non-corrosive coating to surfaces of substances that are subject to chemical attack upon exposure to certain reagents and/or atmospheric conditions, thereby making possible an improved container for corrosive reagents and, in addition, providing a novel laminated structure hitherto impossible.

It has been discovered that certain non-polar compounds, particularly certain halogenated polyethylenes, are especially resistant to corrosion due to their extreme resistance to physical and chemical changes. These characteristics render these substances likely for use as corrosion-resistant coatings for other materials subject to corrosion. However, these non-polar compounds have not been adhered adequately to other substances heretofore by means of conventional adhesives nor have they been effectively bonded to other materials except under conditions of high temperatures and pressures wherein the materials being coated are subject to physical or chemical change deleterious to the material before the bond is effected. Hence, these non-polar compounds have never been utilized previously to their fullest capabilities.

Accordingly, it is an object of the present invention to provide a method for imparting a protective coating to the surface of a material subject to chemical corrosion.

Another object of the present invention is to provide a method of treating certain organic substances to render them amenable for adhesive bonding by means of presently known adhesives to the surface of other substances.

Still another object of the present invention is to provide laminated articles, the laminations of which are firmly bonded by the method taught by the present invention.

It is still another object of the present invention to provide a novel container for corrosive materials wherein the teachings of the present invention are utilized to provide a non-corrosive coating for the container.

These and other objects of the present invention will become apparent upon further study of the following description. It is to be understood, however, that the description contained herein is for purposes of illustration only, and that the scope of the invention is limited only by the extent of the appended claims.

Figure 1:
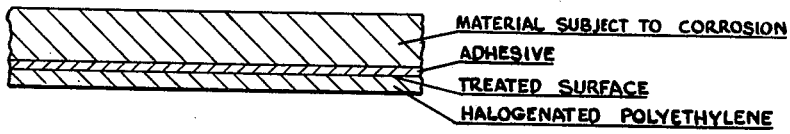
Figure 2:
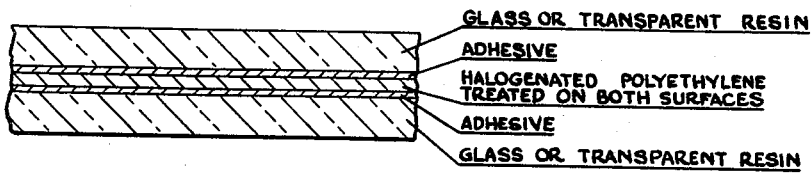
Figure 3:
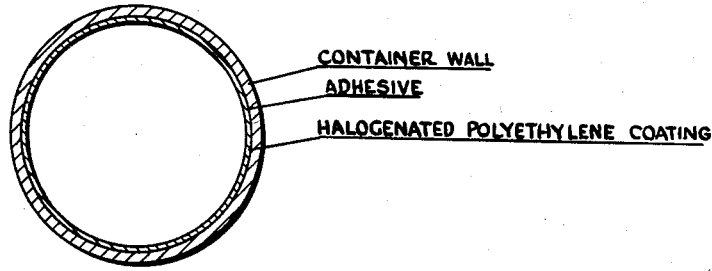

In the drawing, which is to be considered part of the description of this invention, Figure 1 discloses a cross-sectional view of one practical application of the present invention wherein a polymeric halogenated ethylene, not subject to corrosion and comprising no less than two nor more than three fluorine atoms per monomer, is treated on one surface in accordance with the teachings of the present invention to enable that surface to be adhered to an exposed surface of a material that is subject to corrosion, Figure 2 discloses a cross-sectional view of another practical embodiment of the present invention wherein a sheet of a polymeric halogenated compound such as depicted in Figure 1 is rendered suitable for use as an interlayer for a laminated window closure comprising two sheets of either glass or a transparent synthetic material by treating both surfaces of the interlayer in accordance with the teachings of the present invention, thereby rendering it possible to adhere both surfaces of the interlayer in accordance with the teachings of the present invention, i.e., thereby rendering it possible to adhere both surfaces of the halogenated polyethylene compound to individual sheets of the transparent material by means of a suitable adhesive, and Figure 3 represents a cross-sectional view of another practical embodiment of the present invention, namely, a container for corrosive reagents such as fuming nitric acid, wherein at least the inner surface of the container is coated with a halogenated polyethylene in accordance with the teachings of the present invention.

It has been discovered that by modification of their surfaces, certain halogenated polyethylenes having the general formula $(-C_2F_nX_{4-n}-)_m$, where $m$ is any whole number, $n$ equals 2 or 3 and X represents a halogen other than fluorine, can be adhered to other substances by treatment with a phosphite.

It was discovered that by reacting a surface of halogenated polyethylene with a phosphite which could later react further with a wide variety of conventional adhesives, the halogenated ethylene polymer can be adhered to a wide variety of substances subject to corrosion on exposure to corrosive agents. Such substances include glass, polymethyl methacrylate (Lucite), polymethyl alpha chloro acrylate (Gafite), cellulosic materials such as wood and metals, such as aluminum.

The phosphites which may be utilized include aliphatic or aromatic phosphites such as di 2-ethyl hexyl phosphite, diallyl phosphite, di beta chloro allyl phosphite, di vinyl phosphite, mono allyl phosphite, di ethyl phosphite, diphenyl phosphite, phenyl methyl phosphite, etc.

The halogenated polyethylenes that are modified by the phosphite treatments listed above include poly trifluoro chloro ethylene, poly trifluoro bromo ethylene, poly trifluoro iodo ethylene, poly difluoro dichloro ethylene, poly difluoro dibromo ethylene, poly difluoro diiodo ethylene, poly difluoro chloro bromo ethylene, poly difluoro chloro iodo ethylene and poly difluoro bromo iodo ethylene.

One of the aforementioned materials which is most suitable and presently available for use as a protective coating is polychlorotrifluoroethylene, known more commonly under the names Trithene or Kel-F. While this substance is impervious to chemical reaction with most reagents, its use as a protective coating has been limited in the past due to the inability of the material to be bonded to substances liable to corrosion.

Most any commercially available adhesive may be used to bond a treated halogenated ethylene surface to the surface of another substance. Typical adhesives suitable for use are disclosed in Patent No. 2,464,826 to Neher and Bauer. This patent teaches the use of acrylate adhesives. It is also understood that crotonate, methacrylate, alpha chloroacrylate, sorbate and fumarate adhesives are also suitable as well as other commercial types of adhesives, may be utilized as well as those disclosed in the aforementioned patents.

It is believed that the substitution of a fluorine atom for a hydrogen in an ethylene compound results in such a strong bond that the fluorine cannot be removed. It has been repeatedly demonstrated in the laboratory that a completely fluorinated ethylene $(C_2F_4)$ will not react. Prior to the present invention, it had been considered impossible to react any halogen substituted ethylene, even those containing 2 or 3 fluorine atoms substituted for the hydrogens. However, the bond formed by a chlorine, bromine or iodine substituted atom has been found to be capable of substitution by means of a phosphite group to the polymerized fluorinated ethylene monomers. The presence of the fluorine atoms in these monomers provides a compound that is not susceptible of further reaction once the other halogens have reacted. The compounds containing the phosphite groups capable of substitution in lieu of the halogens other than fluorine in the halogenated monomers of polyethylene also contain other reactive groups capable of forming a bond with an adhesive either by polymerization with an adhesive or by chemical reaction.

The following materials and treatments provided good adhesion properties to Trithene:

Alkyl phosphites such as diethyl, dibutyl, dipropyl and di 2-ethyl hexyl phosphite: treatment of the Trithene followed by laminates with conventional adhesives.

The present invention contemplates the use of a phosphite for pretreating the surface of certain halogenated polyethylenes and making it receptive to available adhesives for different types of material rather than utilizing a specific adhesive for each different type of material requiring a protective coating.

The adhesion of pretreated halogenated polyethylenes by conventional adhesives to the following materials was accomplished: polymethyl methacrylate, polymethyl alpha chloro acrylate (sold under the trade name of Gafite), glass, wood and various metals including aluminum, iron, copper, magnesium, nickel, tin, lead, etc., and a multiplicity of alloys may also be bonded to polychlorotrifluoroethylene and the other fluorine containing halogenated polyethylenes described by the teachings embodied in the present invention.

It is believed that the chemical reactions of the phosphites with the class of suitable halogenated polyethylenes are analogous to the amine reactions described in our copending application Serial No. 344,398, filed March 24, 1953, now Patent No. 2,788,306, of which the present application is a division, and also provide a free bond for linkage to a suitable adhesive.

In treating the surface of a film of one of the suitable halogenated polyethylenes with adhesives of limited polarity such as Butyl rubber and various acrylates, methacrylates, etc., use is made of the characteristic of substances of similar polarity to bond to each other. These materials are believed to provide adhesion by means of their ability to bond on the one hand to the non-polar fluorinated halogenated polyethylenes and to adhere to polar substances by means of polar bonding on the other hand. In other words, these substances are suitable as adhesives. The utilization of these substances as adhesives produces sufficient adhesion to report in passing, but the results obtained with the treatments including phosphites are so far superior to these that the latter are preferred.

It has been discovered that the time required for the treatment can be reduced to minutes by raising the temperature. However, certain substances are subject to damage at the temperatures required for speedy treatment. These substances include Gafite and aluminum. However in lieu of raising the temperature, irradiation by ultraviolet light during the treatment also accelerates the desired process.

In the work with Gafite, ultraviolet light was used to accelerate the curing of some samples at room temperature. Bonding of Trithene to polymethyl methacrylate and aluminum was also improved by the use of ultraviolet radiation. The incorporation of diacetyl, as a photosensitizer, hastens the adhesion of Trithene to all of the above materials. Any other suitable photosensitizer may be substituted. Thus, by using ultraviolet radiation for curing Trithene, bonding of Trithene to various materials may be accomplished satisfactorily utilizing polymerizable adhesives.

Ultraviolet irradiation is necessary to secure adhesion to aluminum and accelerates all other adhesions. The concentration of phosphite solution to be utilized, the duration of the treatment and the temperature at which the treatment takes place may be modified to insure that the treatment is limited to the surface only. Since a plurality of substances are suitable for use in modifying the surfaces of the class of halogenated ethylenes listed above, no general rule may be stated for the treatment in view of the wide range of characteristics present in the various products capable of reacting with the halogenated polyethylenes. Care should be taken to modify the more reactive phosphites by dissolving in non-reactive solvents, lowering the temperature of reaction and/or adjusting the reaction time so that the reaction is limited to a surface reaction.

The following experiments were performed to test the suitability of various treatments.

I. Di n butyl phosphite was applied to the surfaces of a sheet of polytrifluorochloroethylene by dipping the latter in the phosphite at 150° C. After removal and washing, the sheet was successfully laminated to a copolymer of methyl methacrylate and methacrylic acid having a mol ratio of 80 to 20 by application of a slight pressure on glass plates on each side of the laminate.

II. A polytrifluorochloroethylene sheet was heated in dibutyl phosphite for one hour at 150° C. The same treatment as that of Example I was used to adhere both surfaces of the sheet to Lucite at contact pressure by laminating for ½ hour at 150° C. Lamination resulted.

The following materials were also tested and the results indicated these materials unsuitable for modifying polytrifluorochloroethylene surfaces:

Araldite AN–102 (Ciba)
Acryloid A–101 (Rohm & Haas)
Glyptal 1276 (General Electric)
Cycleweld C–14 (Chrysler)
Epon 1062 (Shell)
Epon RN–94 (Shell)
Polyamide Resin 93 (General Mills)
Polyamide Resin 50 (General Mills)
Selectron 5208 (Pittsburgh Plate Glass)
Selectron 5200 (Pittsburgh Plate Glass)
N 1 (Pittsburgh Plate Glass)
G 92 (Pittsburgh Plate Glass)
Y–8 (Pittsburgh Plate Glass)
Veloform F (Firestone)
Saran F–120 (Dow)
Saran F–118 (Dow)
Neoprene KNR (Du Pont)
Rez-n-glue (Schwarts)
Poly n-butyl methacrylate
Poly n-octyl methacrylate
Poly n-octyl acrylate
Poly 2-ethyl hexyl acrylate
Poly isobutyl acrylate
Divinyl benzene-n-hexylmethacrylate copolymers
Allyl trifluoro acetate
Allyl perfluoro butyrate
P-trichloro tertiary butyl alcohol
Vinyl trifluoro acetate
Diallyl perfluoro succinate
Difluoro dichloro ethylene polymers
Vinylidene fluoride copolymers with acrylates and methacrylates
Copolymers of ethyl acrylate and beta-chloroethyl acrylate
Poly beta-chloroethoxy ethyl methacrylate
Poly heptafluorobutyl acrylate
Poly tetrahydrofurfuryl acrylate
Triallylcyanurate The teachings of the present invention make possible the use of the halogenated and fluorinated polyethylenes listed above as protective coatings for containers for corrosive liquids, a typical example of which is depicted schematically in cross-section in Figure 3. Other suggested uses include protective coatings for bodies to be exposed to the effects of wind, weather, temperature variations, etc., in laminates where sheets of the non-polar substances comprise the outer sheets and in laminates where a film of one of the non-polar substances comprises a thin interlayer, such as a safety window.

It is understood that the specific embodiments listed above have been described for illustration only and do not constitute the scope of the present invention, reference to the latter being contained in the accompanying claims.

The present application is a division of our copending application Serial No. 344,398 for "Surface Treatment of Halogenated Fluoroethylenes and Laminates Thereof," filed March 24, 1953, now Patent No. 2,788,306.

What is claimed is:

1. An article of manufacture comprising a film produced by reacting a film of polymeric material whose surface is incapable of adhering effectively to other substances and having the general formula $(-C_2F_nX_{4-n}-)_m$, where $m$ equals a positive plural integer, $n$ equals 2 or 3, and X is a halogen other than fluorine, with an organic phosphite capable of reacting with said polymeric material to improve its adhesive properties, and a layer of material subject to corrosion having a continuous surface adhesively bonded to said film.

2. An article of manufacture comprising a film produced by reacting a film of polymeric material having the general formula $(-C_2F_nX_{4-n}-)_m$, where $m$ equals a positive plural integer, $n$ equals 2 or 3, and X is a halogen other than fluorine, with an aliphatic phosphite, and a layer of material subject to corrosion having a continuous surface adhesively bonded to said film.

3. An article of manufacture comprising a film produced by reacting a film of polymeric material having the general formula $(-C_2F_nX_{4-n}-)_m$, where $m$ equals a positive plural integer, $n$ equals 2 or 3, and X is a halogen other than fluorine, with an alkyl phosphite, and a layer of material subject to corrosion having a continuous surface adhesively bonded to said film.

4. An article of manufacture comprising a film produced by reacting a film of polymeric material having the general formula $(-C_2F_nX_{4-n}-)_m$, where $m$ equals a positive plural integer, $n$ equals 2 or 3, and X is a halogen other than fluorine, with dibutyl phosphite, and a layer of material subject to corrosion having a continuous surface adhesively bonded to said film.

5. A laminated article in the form of a sheet comprising a film consisting essentially of the reaction product of polytrifluorochloroethylene with an organic phosphite capable of reacting with polytrifluorochloroethylene to improve its adhesive properties, and a layer of material subject to corrosion having a continuous surface adhesively bonded to said film.

6. A laminated article in the form of a sheet comprising a film consisting essentially of the reaction product of polytrifluorochloroethylene with an aliphatic phosphite and a layer of material subject to corrosion having a continuous surface adhesively bonded to said film.

7. A laminated article in the form of a sheet comprising a film consisting essentially of the reaction product of polytrifluorochloroethylene with an alkyl phosphite and a layer of material subject to corrosion having a continuous surface adhesively bonded to said film.

8. A laminated article in the form of a sheet comprising a film consisting essentially of the reaction product of polytrifluorochloroethylene with dibutyl phosphite and a layer of material subject to corrosion having a continuous surface adhesively bonded to said film.

9. A method of bonding a sheet of polymeric material whose surface is incapable of adhering effectively to other substances and having the general formula $(-C_2F_nX_{4-n}-)_m$, where $m$ equals a positive plural integer, $n$ equals 2 or 3, and X is a halogen other than fluorine, to a base having a continuous surface composed of a material subject to corrosion comprising reacting a surface of said sheet with an organic phosphite capable of reacting with said polymeric material to improve its adhesive properties, applying an adhesive to one of said surfaces, and maintaining the surfaces in juxtaposition until the bond is cured.

10. The method according to claim 9, wherein the surfaces are maintained in juxtaposition in the presence of ultra-violet radiation.

11. A container for corrosive agents comprising a body forming the bottom and sides of said container and a protective coating of a sheet of polymer whose surface is incapable of adhering effectively to other substances and having the general formula $(-C_2F_nX_{4-n}-)_m$, where $m$ equals a positive plural integer, $n$ equals 2 or 3, and X is a halogen other than fluorine, adhesively bonded to at least the inner surface of said body, the surface of said coating facing said inner surface being composed of the reaction product of the sheet with an organic phosphite capable of reacting with said polymer to improve its adhesive properties.

12. The article according to claim 11, wherein the sheet is composed of polytrifluoromonochloroethylene.

13. A laminated structure comprising a plurality of relatively thick sheets of material having continuous inner surfaces, a relatively thin sheet of a polymeric material whose surface is incapable of adhering effectively to other substances and having the general formula $$(-C_2F_nX_{4-n}-)_m$$

where $m$ equals a positive plural integer, $n$ equals 2 or 3, and X is a halogen other than fluorine, between said inner surfaces, said thin sheet having a continuous surface chemically treated with an organic phosphite capable of reacting with said polymeric material to improve its adhesive properties, said continuous surfaces being adhesively bonded at their interfaces.

14. A laminated structure comprising a plurality of relatively thick sheets of rigid, transparent material having continuous inner surfaces, a relatively thin sheet of polymeric material whose surface is incapable of adhering effectively to other substances and having the general formula $(-C_2F_nX_{4-n}-)_m$, where $m$ equals a positive plural integer, $n$ equals 2 or 3, and X is a halogen other than fluorine, between said inner surfaces, said thin sheet having a continuous surface chemically treated with an organic phosphite capable of reacting with said polymeric material to improve its adhesive properties, said continuous surfaces being adhesively bonded at their interfaces.

15. A laminated structure comprising a first sheet of material having continuous surfaces, a relatively thin sheet of polymeric material whose surface is incapable of adhering effectively to other substances and having the general formula $(-C_2F_nX_{4-n}-)_m$, where $m$ equals a positive plural integer, $n$ equals 2 or 3, and X is a halogen other than fluorine, having a continuous surface chemically treated with an organic phosphite capable of reacting with said polymeric material to improve its adhesive properties facing each continuous surface of said first sheet, said continuous surfaces being adhesively bonded at their interfaces.

16. A laminated assembly comprising a sheet consisting essentially of a substance from the class consisting of metals and metal alloys having a continuous surface, and a relatively thin sheet of polymeric material whose surface is incapable of adhering effectively to other substances and having the general formula $(-C_2F_nX_{4-n}-)_m$, where $m$ equals a positive plural integer, $n$ equals 2 or 3, and X is a halogen other than fluorine, having a continuous surface adhesively bonded to said continuous surface of the first sheet, said surface of the polymeric material nearest said continuous surface of the first sheet being composed of the reaction product of the polymer with an organic phosphite capable of reacting with said polymeric material to improve its adhesive properties.

17. The laminated assembly according to claim 16, wherein the polymeric material is polytrifluoromonochloroethylene.

18. The laminated assembly according to claim 6, wherein the phosphite is dibutyl phosphite.

19. The laminated assembly according to claim 6, wherein the substance is aluminum.

20. The laminated assembly according to claim 6, wherein the substance is magnesium.

21. A laminated assembly comprising a pair of glass sheets having continuous inner surfaces, a relatively thin sheet of polymeric material whose surface is incapable of adhering effectively to other substances and having the general formula $(-C_2F_nX_{4-n}-)_m$, where $m$ equals a positive plural integer, $n$ equals 2 or 3 and X is a halogen other than fluorine, between said inner surfaces, said thin sheet having a continuous surface chemically treated with an organic phosphite capable of reacting with said polymeric material to improve its adhesive properties, said continuous surfaces being adhesively bonded at their interfaces.

22. The laminated assembly according to claim 21, wherein the polymeric material is polytrifluoromonochloroethylene.

References Cited in the file of this patent

UNITED STATES PATENTS

| | | |
|---|---|---|
| 2,559,749 | Benning | July 10, 1951 |
| 2,705,691 | Panagrossi et al. | Apr. 5, 1955 |
| 2,724,672 | Rubin | Nov. 22, 1955 |

OTHER REFERENCES

Industrial and Engineering Chemistry, July 1953, pages 1555–1557.

UNITED STATES PATENT OFFICE
CERTIFICATION OF CORRECTION

Patent No. 2,941,912                  June 21, 1960

Robert P. Cox et al.

It is hereby certified that error appears in the above numbered patent requiring correction and that the said Letters Patent should read as corrected below.

Column 7, lines 9, 11, and 13, for the claim reference numeral "6", each occurrence, read -- 16 --.

Signed and sealed this 30th day of May 1961.

(SEAL)
Attest:

ERNEST W. SWIDER
Attesting Officer

DAVID L. LADD
Commissioner of Patents